(12) United States Patent
Inoue

(10) Patent No.: US 9,609,148 B2
(45) Date of Patent: Mar. 28, 2017

(54) COMMUNICATION APPARATUS, METHOD OF CONTROLLING THE SAME, AND STORAGE MEDIUM

(71) Applicant: CANON KABUSHIKI KAISHA, Tokyo (JP)

(72) Inventor: Yutaka Inoue, Abiko (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/818,792

(22) Filed: Aug. 5, 2015

(65) Prior Publication Data
US 2016/0044186 A1    Feb. 11, 2016

(30) Foreign Application Priority Data
Aug. 8, 2014   (JP) .................................. 2014-163048

(51) Int. Cl.
*H04N 1/00*   (2006.01)
(52) U.S. Cl.
CPC ....... *H04N 1/00214* (2013.01); *H04N 1/0022* (2013.01); *H04N 1/00209* (2013.01); *H04N 1/00212* (2013.01); *H04N 1/00241* (2013.01)
(58) Field of Classification Search
USPC ..................................... 358/1.15, 1.14, 1.13
See application file for complete search history.

(56) References Cited

U.S. PATENT DOCUMENTS

| | | | | |
|---|---|---|---|---|
| 6,246,684 B1* | 6/2001 | Chapman | ................ | H04L 29/06 370/363 |
| 2002/0051170 A1* | 5/2002 | Kuwahara | .......... | H04N 1/32037 358/1.15 |
| 2003/0095289 A1* | 5/2003 | Mitani | ............... | H04N 1/32005 358/402 |
| 2003/0117665 A1* | 6/2003 | Eguchi | ............... | H04N 1/00212 358/402 |
| 2007/0041055 A1* | 2/2007 | Kotani | ............... | H04N 1/00384 358/448 |
| 2007/0160086 A1* | 7/2007 | Huang | ................ | H04M 1/2535 370/493 |

(Continued)

FOREIGN PATENT DOCUMENTS

| | | |
|---|---|---|
| JP | H04-74058 A | 3/1992 |
| JP | H11-88583 A | 3/1999 |

(Continued)

OTHER PUBLICATIONS

"IP Fax Expansion Kit Users Guide", Canon Inc., Canon Marketing Japan Inc., pp. 1-1 to 2-16, Dec. 5, 2013 [retrieved from Internet on Jun. 9, 2016] URL:http://gdlp01.c-wss.com/gds/4/0300013414/01/ipfax-expansionkit-users.pdf.

(Continued)

*Primary Examiner* — Jerome Grant, II
(74) *Attorney, Agent, or Firm* — Carter, DeLuca, Farrell & Schmidt, LLP

(57) ABSTRACT

The present invention provides a communication apparatus configured to transmit image data through a network and a control method therefor. The apparatus stores, as transmission history, a destination and a communication mode for IPFAX at a time of transmission, reads the destination and the communication mode, and transmits image data to the read destination in the read communication mode.

14 Claims, 15 Drawing Sheets

(56) References Cited

U.S. PATENT DOCUMENTS

| | | | | |
|---|---|---|---|---|
| 2010/0131678 A1* | 5/2010 | Lee | ......... | G06F 13/28 |
| | | | | 710/22 |
| 2011/0188076 A1* | 8/2011 | Maeda | .......... | G06F 15/00 |
| | | | | 358/1.15 |
| 2014/0320897 A1* | 10/2014 | Takahashi | ......... | H04N 1/00411 |
| | | | | 358/1.15 |

FOREIGN PATENT DOCUMENTS

| | | | |
|---|---|---|---|
| JP | H11-98284 A | 4/1999 | |
| JP | 2002-232588 A | 8/2002 | |
| JP | 2005-142622 A | 6/2005 | |
| JP | 2006-245671 A | 9/2006 | |
| JP | 2006295291 | * 10/2006 | ............ H04N 1/00 |
| JP | 2008-131223 A | 6/2008 | |
| JP | 2008-252762 A | 10/2008 | |
| JP | 2010-016657 A | 1/2010 | |
| JP | 2011-044852 A | 3/2011 | |
| JP | 2011-109199 A | 6/2011 | |

OTHER PUBLICATIONS

Japanese Office Action issued in corresponding application No. 2014163048 on Jun. 21, 2016.
Japanese office action issued in corresponding application No. 2014163048 on Jan. 30, 2017.

* cited by examiner

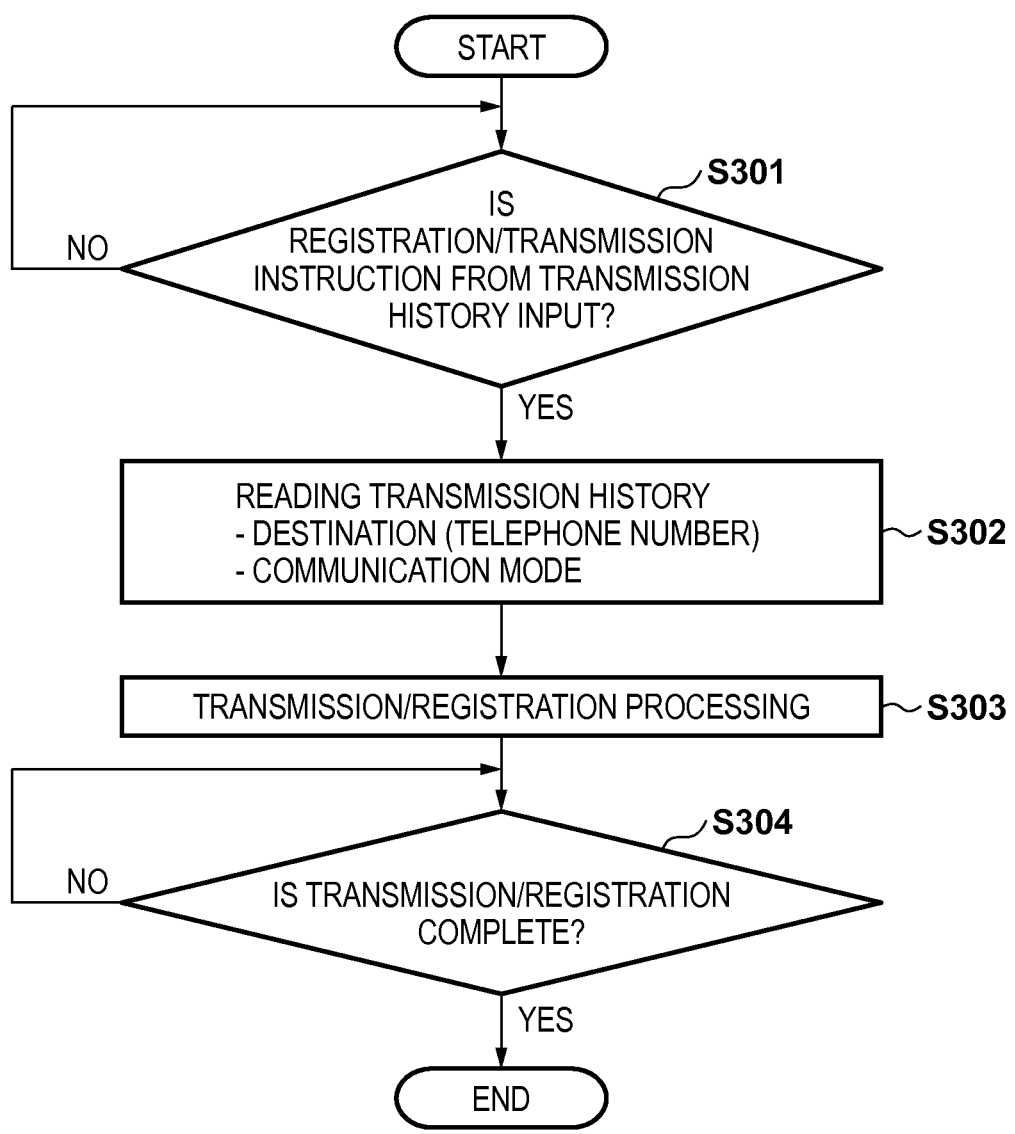

FIG. 7

| SETTING REGISTRATION  <SIP: INTRANET REGISTRATION> |
|---|

PLEASE ENTER VIA NUMERIC KEYPAD

| FIRST SERVER IP ADDRESS | 192.163.1.1 | | SPACE | BACKSPACE |
| SECOND SERVER IP ADDRESS | 192.163.1.3 | | | |

CANCEL                                                         OK

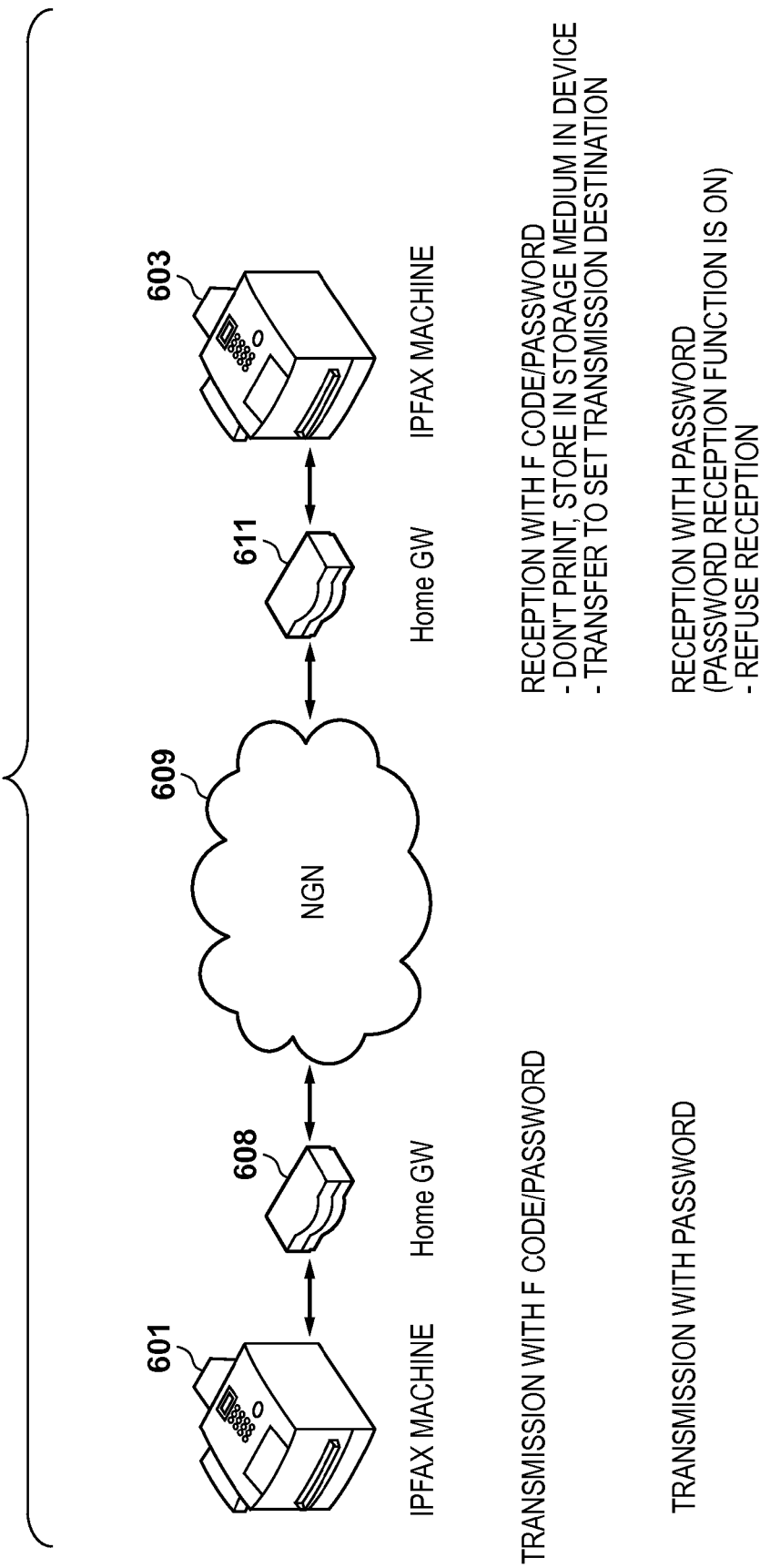

FIG. 9

| SETTING ITEM | DETAILS | | NECESSARY FOR DESTINATION REGISTRATION OR RETRANSMISSION FROM TRANSMISSION HISTORY |
|---|---|---|---|
| FAX NUMBER | PARTNER FAX NUMBER | | NECESSARY |
| COMMUNICATION MODE | IP FAX (INTRANET)/ IP FAX (NGN)/ IP FAX (NGN MY NUMBER) IP FAX (VoIP GATEWAY) | | NECESSARY |
| F CODE | ARBITRARY NUMBER, #, * | | GREY |
| PASSWORD | ARBITRARY NUMBER, #, * | | GREY BUT CANNOT BE INHERITED AS HISTORY |
| ECM TRANSMISSION | ON/OFF | | UNNECESSARY |
| TRANSMISSION SPEED | 33600/14400/9600/4800bps | | UNNECESSARY |
| INTERNATIONAL TRANSMISSION | DOMESTIC TRANSMISSION/INTERNATIONAL TRANSMISSION (1)-(3) | | UNNECESSARY |
| COMMUNICATION MODE | IP FAX (INTRANET)/ IP FAX (NGN)/ IP FAX (NGN MY NUMBER) IP FAX (VoIP GATEWAY) | | NECESSARY |
| RESOLUTION | 400×400 - 100×200dpi | | UNNECESSARY |
| READING SIZE | AUTOMATIC, STANDARD, SET ARBITRARILY, LONG-SIZE ORIGINAL, FREE SIZE | | UNNECESSARY |
| DENSITY | DENSITY ADJUSTMENT | | UNNECESSARY |
| BACKGROUND ADJUSTMENT | AUTOMATIC/ADJUSTMENT | | UNNECESSARY |
| ORIGINAL TYPE | TEXT/TEXT AND PHOTOGRAPH/PHOTOGRAPH | | UNNECESSARY |
| DOUBLE-SIDED ORIGINAL | OPENS HORIZONTALLY/OPENS VERTICALLY | | UNNECESSARY |
| ORIGINAL SIZE MIXED | SAME WIDTH/DIFFERENT WIDTH | | UNNECESSARY |
| TWO-PAGE SPREAD | LEFT-OPENING ORIGINAL / RIGHT OPENING ORIGINAL | | UNNECESSARY |
| SHARPNESS | ADJUSTMENT | | UNNECESSARY |
| MAGNIFICATION | FULL SIZE, FIXED-RATE SCALING, VARIABLE MAGNIFICATION | | UNNECESSARY |
| FRAME ERASE | ADJUSTMENT | | UNNECESSARY |
| SEQUENTIAL READ | | | UNNECESSARY |

STATUS CONFIRMATION

| JOB STATUS | JOB HISTORY | | FAX ▼ |

| DATE/TIME | DEPARTMENT ID | DESTINATION | RESULT |
|---|---|---|---|
| — 05/21 14:00 | ------ | AAA COMPANY | OK |
| — 05/21 14:05 | ------ | 0338162111 | OK |
| — 05/21 14:10 | ------ | BBB COMPANY | OK |

401

1/10

| DETAILED INFORMATION | LIST PRINT | DESIGNATE AS TRANSMISSION DESTINATION | REGISTER DESTINATION |

408

PRESSING OF "DESIGNATE AS TRANSMISSION DESTINATION" BUTTON ⬇

1402

STATUS CONFIRMATION

ATTEMPTING TO TRANSMIT TO DESTINATION WITH PASSWORD. RE-SET PASSWORD?
SELECTING "NO" MEANS TRANSMISSION WITH NO PASSWORD.  —1405

1403 YES    1404 NO

1/10

COMMUNICATION APPARATUS, METHOD OF CONTROLLING THE SAME, AND STORAGE MEDIUM

BACKGROUND OF THE INVENTION

Field of the Invention

The present invention relates to a communication apparatus, a method of controlling the same, and a storage medium.

Description of the Related Art

Conventionally, there is a facsimile apparatus capable of selecting a desired telephone number from a transmission history of facsimile transmission and setting the telephone number as a destination. In the case of a facsimile transmission using a public switched telephone network, a partner is uniquely determined just with the telephone number of the destination, so a user is able to transmit to a desired destination if the destination is set by calling just the telephone number.

However, in the case of IPFAX, the destination changes in accordance with a communication mode (NGN, VoIP GW, intranet), even with the same telephone number. Therefore, even if just a telephone number to which transmission was made to in the past is selected and set as a destination, a user cannot easily understand which communication mode to set.

Japanese Patent Laid-Open No. 2002-232588 discloses a technique in which a transmission destination is identified from a transmission history and then retransmission is performed. However, in this document, a destination is inherited together with mutually differing protocols (FAX, IPFAX, electronic mail, FILE), but a connecting destination is not inherited together with the destination with a single protocol called IPFAX.

In the case of IPFAX as described above, if just a telephone number is inherited when selecting a destination from a transmission history, performing retransmission, and registering the destination in an address book, it is not clear which communication mode to select as a connecting destination out of NGN, a VoIP GW, or an intranet. At this time, if it is set so that a user can select a communication mode arbitrarily, there is a possibility of causing a mistake transmission by connecting to a destination different from a destination to which transmission was previously performed. For example, consider the case in which a telephone number "03-626-2111" is registered, and a history of transmitting to the number "626-2111" that excludes an area code is used. If transmission is performed using a telephone number and selecting NGN as a communication mode, then transmission is to "626-2111" which starts from a local telephone number, but if an intranet is selected as the communication mode, then transmission is to an extension number of "626-2111".

Furthermore, the prior art does not mention in regard to an F code or a password used with a transfer instruction or the like, such as confidential reception or relay broadcast, which are handled by a fax protocol.

SUMMARY OF THE INVENTION

An aspect of the present invention is to eliminate the above-mentioned problems with conventional technology.

A feature of the present invention is to provide a technique for storing as a transmission history a destination and also a communication mode when transmitting, and when performing retransmission or registration into an address book using the transmission history, performing retransmission or registration with inheriting the destination and the communication mode.

According to a first aspect of the present invention, there is provided a communication apparatus operable to transmit image data through a network, comprising: a storage unit configured to store, as a transmission history, a destination and a communication mode for IPFAX at a time of transmission; a reading unit configured to read the destination and the communication mode from the storage unit, and a transmission unit configured to transmit image data to the read destination in the read communication mode.

According to a second aspect of the present invention, there is provided a communication apparatus configured to transmit image data through a network, comprising: a storage unit configured to store, as a transmission history, a destination, a communication mode for IPFAX, and a sub-address used for the transmission at a time of transmission; a display unit configured to display a list of the transmission history stored in the storage unit; a first determination unit configured to determine whether or not a transmission history selected from the list of the transmission history displayed by the display unit contains the subaddress; a first selection unit configured to allow a user to select whether to transmit to a destination containing the subaddress, when the first determination unit determines that the subaddress is included; and a transmission unit configured to read the destination that includes the subaddress and the communication mode, and transmit image data to the destination that includes the subaddress in the communication mode, when transmission to the destination that includes the subaddress is selected by the first selection unit.

Further features and aspects of the present invention will become apparent from the following description of exemplary embodiments, with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a flowchart for describing destination registration processing or retransmission, with referring to a transmission history, by the communication apparatus according to the first embodiment.

FIG. 7 depicts a view for showing an example of a display screen for setting a plurality of SIP servers.

FIG. 8 depicts a view for explaining an overview of transmission/reception with an F code or a password.

FIG. 9 depicts a view for showing an example of setting items when transmitting an IPFAX.

FIG. 14 depicts a view for showing an example of screens displayed on the console unit when performing a fax transmission after selecting from a transmission history a destination that includes a password, in the second embodiment.

FIG. 15 depicts a view for showing an example of screens displayed on the console unit when selecting a destination that includes a password from a transmission history and then registering the destination into an address book, in the second embodiment.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
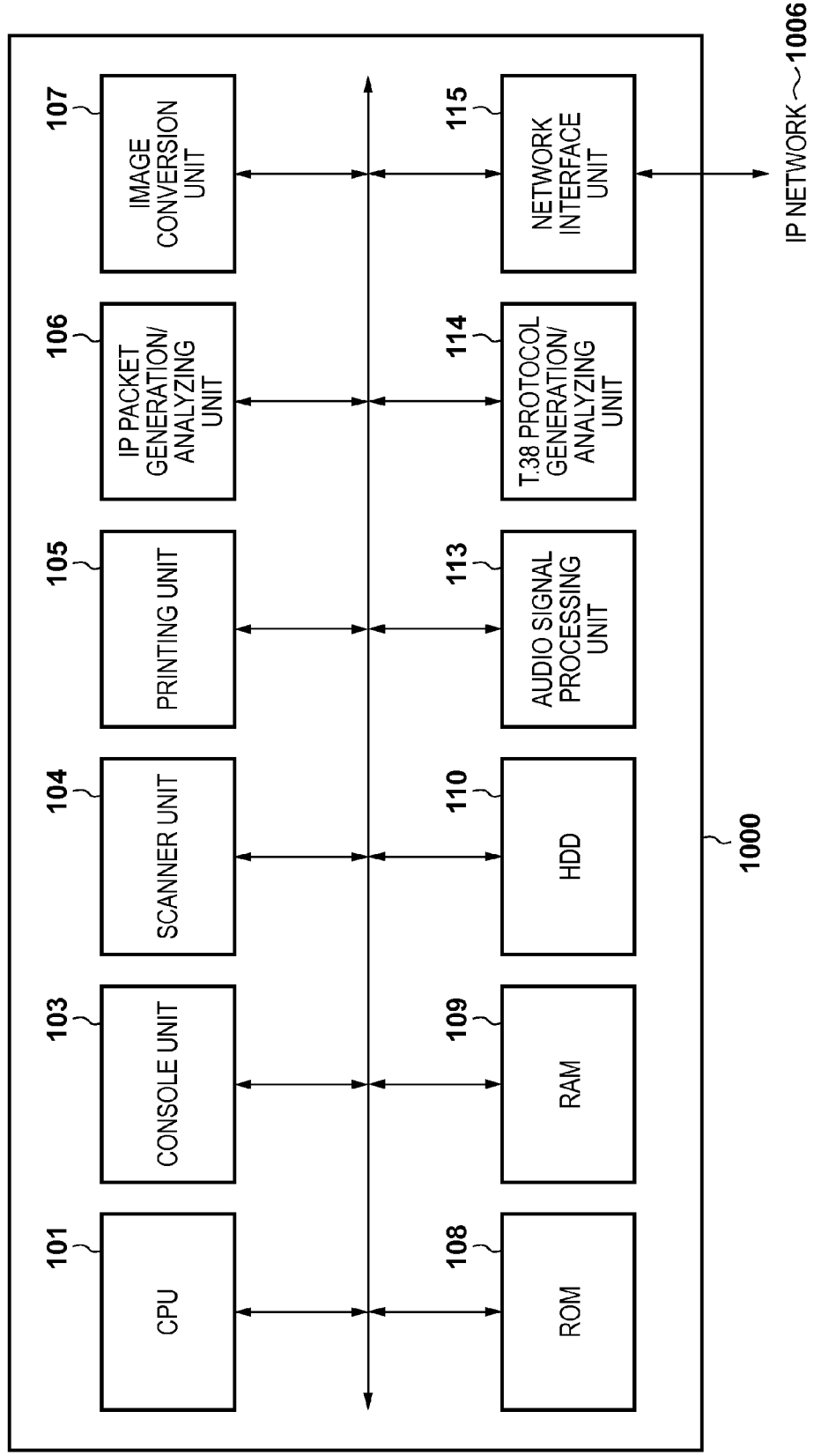
FIG. 1 is a block diagram describing an overview configuration of a communication apparatus according to a first embodiment of the present invention.

FIG. 1 is a block diagram explaining an overview configuration of a communication apparatus 1000 according to a first embodiment of the present invention.

In accordance with a program deployed into a RAM 109, a CPU 101 controls each part of the communication apparatus 1000. A console unit 103 comprises a display unit, provided with a touch panel function, and a key operation unit that includes a hard key or the like. For example, a window, icon, message, menu, or other user interface information is displayed on a screen of the display unit. The key operation unit comprises various keys, such as a start key and a stop key, for a user to instruct a copy, fax or printer operation. A scanner unit 104 reads an original document, and then outputs image data of the original document. A printing unit 105 performs, for example, printing in accordance with print data stored on an HDD (hard disk drive) 110 or the like. A ROM 108 stores various data, a boot program executed by the CPU 101, or the like. The RAM 109 has a work area for the CPU 101, a save region for data at times of error processing, a loading area for a control program, or the like. The HDD 110 saves an OS, various control programs, or print data. The CPU 101 executes the boot program from the ROM 108, and then deploys OS and programs stored in the HDD 110 into the RAM 109 and executes the OS or various control programs. Transmission history and an address book and the like, which are explained later, are also stored in the HDD 110 (memory).

An IP packet generation/analyzing unit 106 maps an ITU-T Recommendation T.38 protocol to an IP packet, or extracts an ITU-T Recommendation T.38 protocol from a received IP packet. An image conversion unit 107 performs compression, decompression, magnification/reduction, linear density transformation, and the like for an image to be transmitted in a FAX communication. An audio signal processing unit 113 analyzes an audio packet received from an IP network 1006. A T.38 protocol generation/analyzing unit 114 generates facsimile transmission information in accordance with an ITU-T Recommendation T.38 protocol, and extracts facsimile transmission information from information received by means of this protocol. A network interface unit 115 is connected to the IP network (a high-speed digital line network) 1006, and transmits/receives a digital signal with the IP network 1006.

Next, operation of the communication apparatus 1000 according to the first embodiment of the present invention will be described with reference to the flowchart in FIG. 2.

Figure 2:
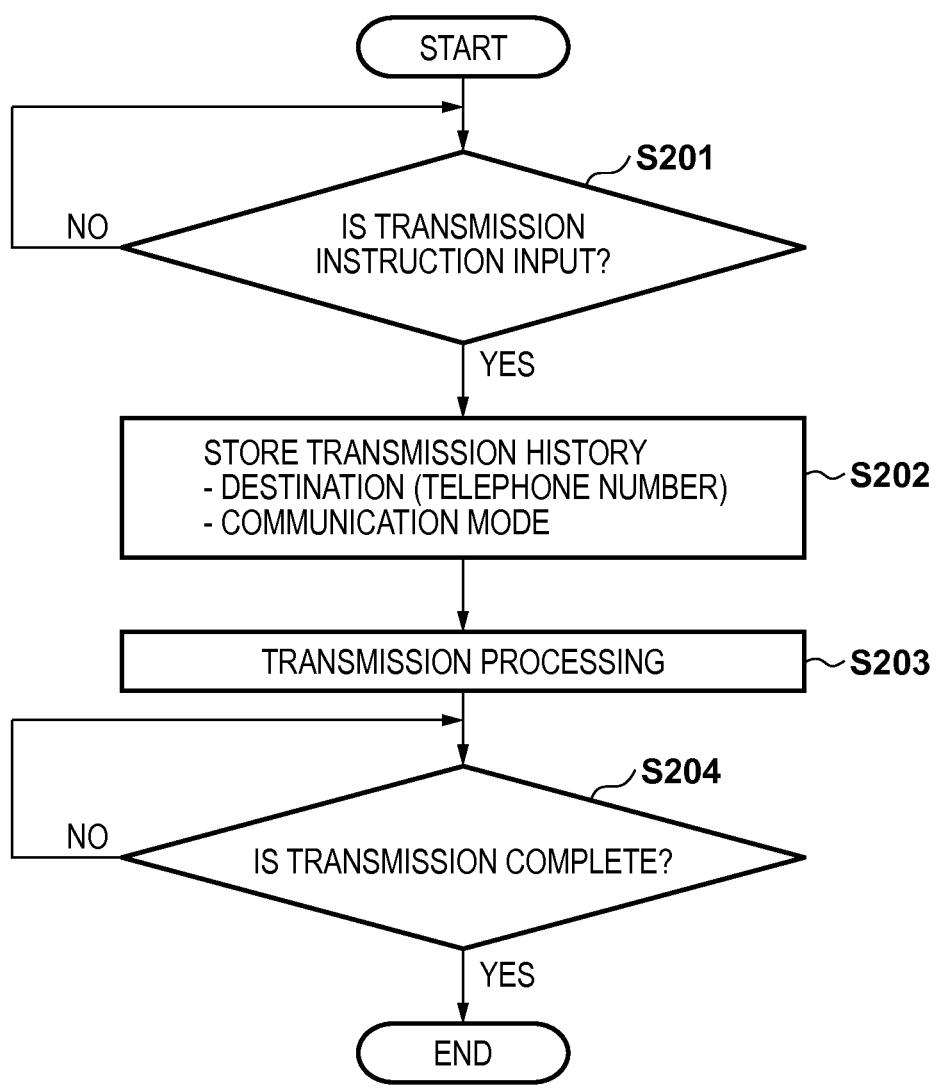
FIG. 2 is a flowchart for describing transmission processing by the communication apparatus according to the first embodiment.

FIG. 2 is a flowchart for describing transmission processing by the communication apparatus 1000 according to the first embodiment. Here is shown initial transmission processing for storing transmission history. Note that, a program that executes this processing is installed on the HDD 110, and when executed is deployed into the RAM 109 and executed under the control of the CPU 101.

Firstly, in step S201, the CPU 101 determines whether or not a fax transmission instruction has been input. Here, for example, it is determined that there is a transmission instruction when the transmission instruction is performed by a user operating the console unit 103 to input a destination, setting an original to transmit to the scanner unit 104 and then pressing a start key or the like on the operation unit 103. When the transmission instruction is input, processing advances to step S202, and the CPU 101 stores setting information set for the fax transmission in the HDD 110 or the like, so that the setting information can be reused later for retransmission that references transmission history or registering in an address book. Note that the setting information includes not just a telephone number representing a destination, but also a communication mode, at least. Next, processing proceeds to step S203, and the CPU 101 executes the fax transmission. In step S204 the CPU 101 waits for the fax transmission to terminate, and processing terminates when the fax transmission terminates.

Through this processing, when the fax transmission is executed, a telephone number for the destination and the communication mode for the time of transmission are stored as transmission history.

Next, an operation of retransmission and registering a destination, with reference to the transmission history registered by means of the flowchart in FIG. 2, will be explained with reference to a flowchart in FIG. 3.

FIG. 3 is a flowchart for describing destination registration processing or retransmission, with referring to a transmission history, by the communication apparatus 1000 according to the first embodiment. Note that, a program that executes this processing is installed on the HDD 110, and when executed is deployed into the RAM 109 and executed under the control of the CPU 101.

Firstly, in step S301 the CPU 101 determines whether or not there has been a transmission instruction that refers to a transmission history, or an address registration instruction, which registers in an address book with referring to a transmission history. This is, for example, determining whether a user has operated the console unit 103 to display a status confirmation screen to be explained later with reference to FIG. 4A, and pressed a "designate as transmission destination" button 408 or a "register destination" button 409. Processing advances to step S302 if the CPU 101 determines that the "designate as transmission destination" button 408 or the "register destination" button 409 has been pressed, and the CPU 101 reads a destination and communication mode from setting information (the transmission history) for the time of transmission, which was registered into the HDD 110 in step S202 of FIG. 2. Next, processing advances to step S303, and the CPU 101 either sets the destination and communication mode read in step S302 as transmission information for retransmission, or registers the destination and communication mode in an address book. Next processing advances to step S304, and the processing terminates when the CPU 101 determines that transmission or destination registration has completed.

Through this processing, it is possible to use a destination stored as transmission history to perform fax transmission or registration into an address book.

Figure 4A:
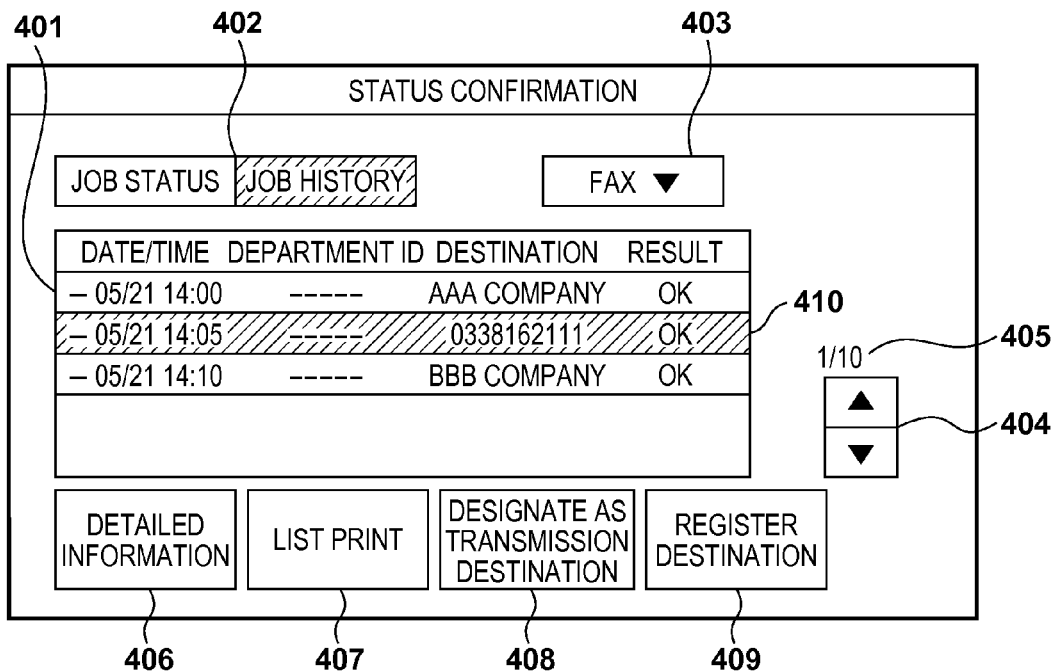
FIG. 4A depicts a view for illustrating an example of a status confirmation screen displayed on a console unit of the communication apparatus according to the first embodiment.

FIG. 4A depicts a view for illustrating an example of a status confirmation screen displayed on the console unit 103 of the communication apparatus 1000 according to the first embodiment.

This status confirmation screen displays a list of jobs that were activated in the past on a list 401. FIG. 4A displays a case for a fax transmission job. The list 401 includes a date and time (a transmission date and time), a department ID (a department to which a sender belongs), a destination (a transmission destination), and a result (a transmission result). "Date/Time" indicates a date and time at which a fax transmission was performed, and "department ID", for example, displays a department (management department, design department, or the like) to which a person transmitting a FAX belongs. In FIG. 4A, no department ID has been set, so " - - - " is displayed. "Destination" is a destination denoting a transmission destination. For destination, if an abbreviated name for the destination was stored in the history information, then the abbreviated name is displayed, and a telephone number is displayed if an abbreviated name was not stored. "Result" displays a transmission result with OK (transmission success) or NG (transmission failure).

A transmission history is information recording setting details set at the time of transmission or a transmission result, and includes a date and time, department ID, destination (telephone number, abbreviated name) and result described in the list 401. Jobs from the list 401 can be selected by using a cursor 410 or the like to select a job displayed on the list 401. In FIG. 4A, a job for the date and time "5/21 14:05", indicated by the cursor 410, is selected. A "job status" "job history" selection button 402 is a button for switching between the display of a job being executed and the display of a job history, and in FIG. 4A, "job history" is selected. A job type selection button 403 is for selecting the type of a job that is displayed. Pressing the job type selection button 403 opens a pull-down menu (not shown), and a job type other than fax, such as copy, print or scan, can be selected. In FIG. 4A, "FAX" is selected as the job type. Scroll buttons 404 are buttons for scrolling the display of the list 401 in an upward/downward orientation. A list display screen number 405 displays which number for the entire list the list displayed on the screen corresponds to. In FIG. 4A, the number shows that out of ten lists as a whole, the first list is being displayed. If a detailed information button 406 is pressed in this state, transition is made to a detailed information screen that displays details of the job selected in the list 401. An explanation of the detailed information screen is omitted. A list print button 407 is used to instruct the printing of contents of the list 401. When the "designate as transmission destination" button 408 is pressed, information is inherited from a transmission history selected by the cursor 410 of the list 401, and transition is made to a screen for retransmission to the same destination as for the transmission history. Explanation of this screen will be given later with reference to FIG. 4B. The "register destination" button 409 is for transitioning to a screen for registering in an address book of the communication apparatus 1000 a destination from a transmission history selected by the cursor 410 in the list 401. Explanation of this screen will be given later with reference to FIG. 5A.

Figure 4B:
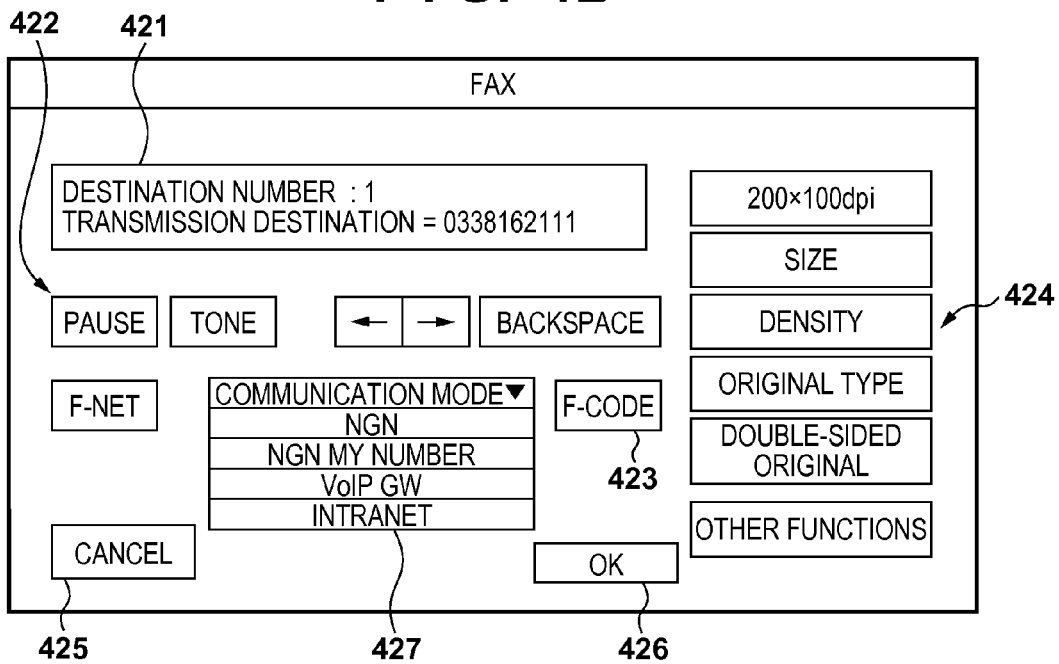
FIG. 4B depicts a view for illustrating an example of a fax transmission screen displayed when a designate as transmission destination button is pressed in FIG. 4A.

FIG. 4B depicts a view for illustrating an example of a fax transmission screen displayed when the "designate as transmission destination" button 408 in FIG. 4A is pressed.

The fax transmission screen has a destination display section 421 for displaying a destination selected from a job history as previously mentioned. Here, the telephone number for the destination selected in FIG. 4A is read from the history information and then displayed. Note, if an abbreviated name is set in the history information, it is possible to also display the abbreviated name in this screen, but this example only displays a telephone number and does not display an abbreviated name as well. A destination input button group 422 is used to change (edit) a displayed destination. The button group 422 includes buttons for the input of, besides a number, a pause, tone, F-Net (F-Net service setting) to be input to the destination, buttons for cursor movement (→, ←) for the telephone number displayed by the destination display section 421, a delete button (backspace), or the like. Note that a numerical value input for a destination is performed by means of a numeric keypad that is not shown. If an F code input screen transition button 423 is pressed, for example, a transition is made to an F code/password input screen, as shown by FIG. 5B. Note that explanation is given later with reference to FIG. 5B in regards to the F code and the password. A detailed setting button group 424 is buttons for setting other settings for when transmitting a fax, for example a read resolution (200×100 dpi in the example for FIG. 4B), an original size, a reading density, the type of the original (text, picture, or the like), a double-sided original, or the like. Furthermore, when an "other functions" button is pressed, transition is made to a screen for performing further detailed settings. A cancel button 425 and an OK button 426 are used when cancelling or completing the settings of this screen. When the OK button 426 is pressed, it becomes possible to further input a destination for a subsequent fax transmission. A communication mode selection button 427 is used with an IPFAX according to the first embodiment, for which explanation is given later.

With the fax transmission screen, after setting of a destination, a communication mode, or the like is completed, if a start button (not shown) for the console unit 103 is pressed to instruct a fax transmission, the fax transmission to the destination starts. Thus, it is possible to retransmit a fax that inherits history information that was transmitted in the past.

Figure 5A:
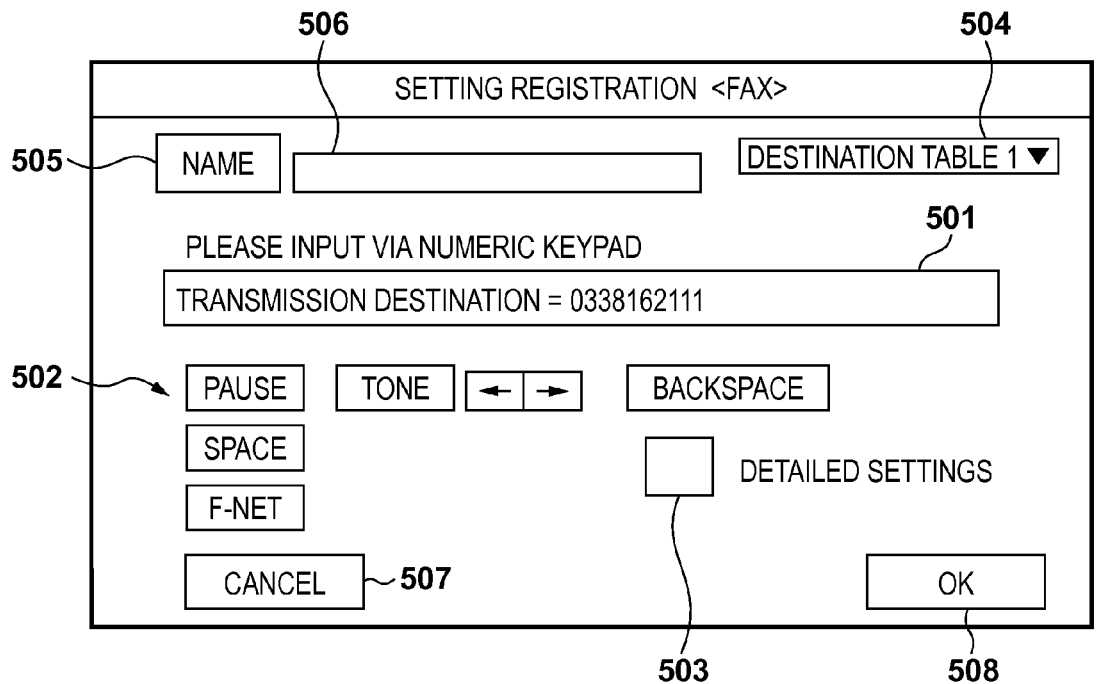
FIG. 5A depicts a view for illustrating an example of a destination registration screen displayed when a destination registration button is pressed in FIG. 4A.
Figure 5B:
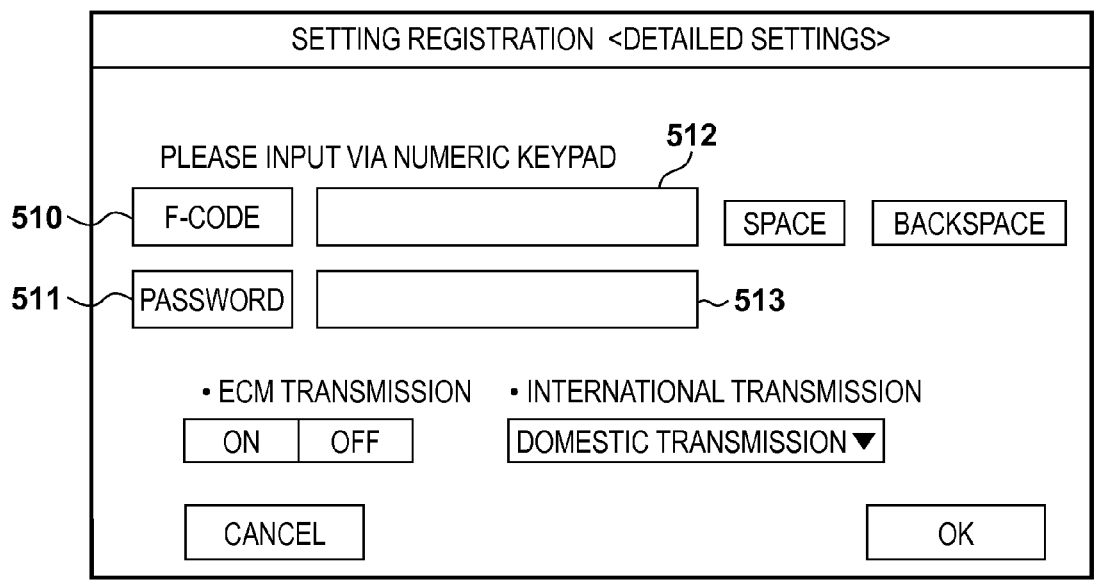
FIG. 5B depicts a view for showing an example of an input screen for an F code or a password.

FIG. 5A depicts a view for illustrating an example of a destination registration screen displayed when the "register destination" button 409 in FIG. 4A is pressed. Using this screen, a destination from a transmission history can be registered in an address book or the like.

A destination display section 501 displays a destination (telephone number) selected through the list 401 of history. A destination input button group 502 is for changing a destination displayed in the destination display section 501, and includes a pause button, a tone button, a space button, and an F-Net button for non-number input, buttons for cursor movement (→, ←) for the telephone number displayed by the destination display section 501, a delete button (backspace), or the like. Note that a numerical value input for a destination is performed through a numeric keypad that is not shown. If a detailed setting transition button 503 is pressed, transition is made to a screen for performing setting of settings other than those displayed (read resolution, original size, reading density, the type of original (text, picture, etc), double-sided original, F code, or the like). A destination table selection button 504 is a button for selecting a grouped destination table (address book) (for example, destination tables 1-10), and in FIG. 5A the group for a first destination table is selected. A destination name input button 505 is a button for inputting a name for a destination, and by pressing this button 505, a keyboard (not shown) or the like is displayed in a destination name display section 506, and by using this it is possible to input a name of the destination. A cancel button 507 and an OK button 508 are buttons for instructing cancellation or setting completion, respectively, for details set through the screen. Here, when the OK button 508 is pressed, details set through the screen are registered to an address book of the communication apparatus 1000. In this way, it is possible to perform destination registration that inherits information from a transmission history to an address book.

FIG. 5B depicts a view for showing an example of the F code/password input screen displayed when the F code input screen transition button 423 is pressed on the screen of FIG. 4B, or when password setting is instructed through a screen on FIG. 15, which is explained later.

The F code or password is used in a transfer instruction for confidential reception, relay broadcast, or the like. In the figure, when an "F code" button 510 or a "password" button 511 is pressed, it becomes possible to enter a code to an F code input screen 512 or a password input screen 513, which are on the right-side. Here, it is possible to perform other detailed setting, such as ECM transmission, international transmission, or the like defined in T.30, but explanation here is omitted.

Next, explanation will be given for IPFAX used in the first embodiment.

In addition to G3FAX transmission which is fax transmission using conventional analog telephone lines (PSTN), there is IPFAX transmission which is fax transmission using a network (an IP network). Fax transmission using an IP network is an ITU-T recommended transmission method called T.38, and is a method for keeping as a digital signal and transmitting a signal, which in the conventional T.30 protocol is modulated into analog and then transmitted. Compared to T.30, high speed transmission can be performed with T.38. SIP (Session Initiation Protocol) is used as a call control technique for this transmission method, and point to point transmission over an IP network is realized.

Figure 6:
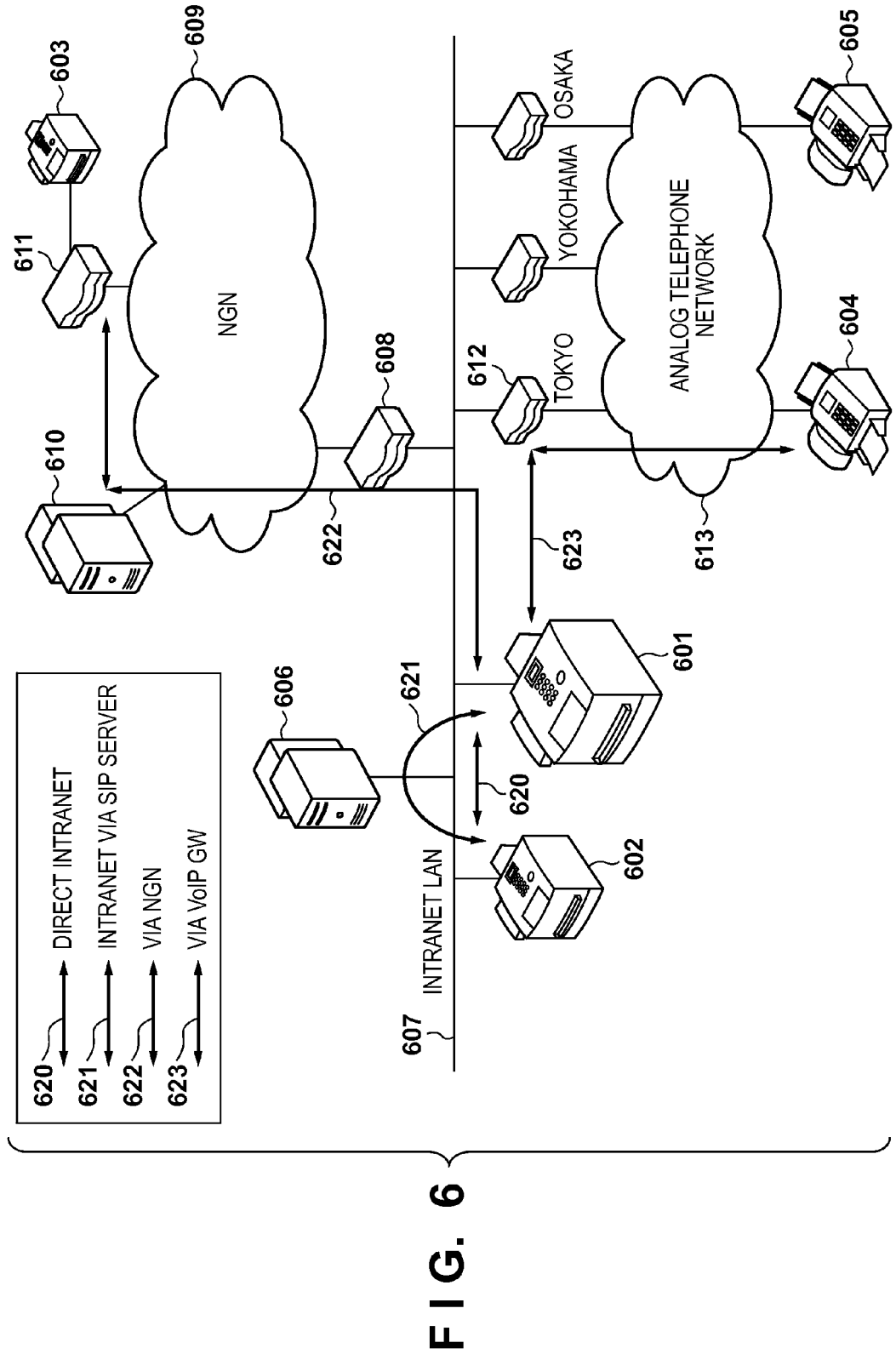
FIG. 6 depicts a view showing a communication environment that focuses on an IPFAX device.

FIG. 6 depicts a view showing a communication environment that focuses on an IPFAX device 601.

Connecting destinations for the IPFAX device 601 are an intranet environment that communicates with an IPFAX device 602, and an IP public telephone network (an NGN: Next Generation Network) environment (a connection 622) that communicates with an IPFAX device 603. Furthermore, the IPFAX device 601 has a VoIP GW (Voice over IP Gateway) environment (a connection 623) that communicates with a G3FAX device 604 or a G3FAX device 605. The intranet environment that communicates with the IPFAX device 602 has a direct intranet connection 620 that designates an IP address for a direct partner, and a SIP server connection 621 that connects to the IPFAX device 602 through an intranet SIP server 606.

Here, the direct intranet connection 620 communicates by directly establishing a session between the IPFAX device 601 and the IPFAX device 602, which are connected to an intranet LAN 607. For example, when the IPFAX device 601 transmits a fax to the IPFAX device 602, the IPFAX device 601 designates the IP address of the IPFAX device 602 as the communication destination, and a connection is made with the direct partner device.

The connection 621, which is via the intranet SIP server, uses an extension telephone number in a connection, and uses the SIP server 606 to obtain an IP address for a communication partner from the extension number. For example, when transmitting an IPFAX from the IPFAX device 601 to the IPFAX device 602, the extension telephone number of the IPFAX device 602 is designated as a communication destination by the IPFAX device 601, and furthermore, this information is transmitted to the SIP server 606, which has been set in advance for the IPFAX device 601. The SIP server 606, which has received the extension telephone number, notifies the IPFAX device 601 of an IP address for the IPFAX device 602, which corresponds to the extension telephone number, and thereafter communication is performed between the IPFAX device 601 and the IPFAX device 602 using this IP address. For an IP address for the intranet SIP server 606, an IP address that a user registers in advance in the IPFAX device 601 is used, and there are cases in which a plurality of SIP servers are registered. These are used as alternative servers when an SIP server to which connection is first attempted is down.

FIG. 7 depicts a view for showing an example of a display screen for setting a plurality of SIP servers.

Here, "192.163.1.1" is set as an IP address for a first server, and "192.163.1.3" is set as an IP address for a second server.

Returning to FIG. 6 once again, if a connection via an intranet SIP server is designated for the IPFAX device 601, the IPFAX device 601 first communicates an extension number, for a partner device to which connection is desired, to the IP address of the first server. However, if connection cannot be performed due to a reason such as the first server being down or there being no information for a partner device on the first server, a connection to the first server is given up on, and a connection to the second server is attempted.

The connection 622 to the IP public telephone network (NGN) is communication through the IPFAX device 601—an intranet LAN 607—a home GW 608—an NGN 609—an NGN SIP server 610—a home GW 611—the IPFAX device 603. In this case, a connection to a partner device from the IPFAX device 601 uses a common telephone number. Similar to the intranet SIP server 606 previously mentioned, the NGN SIP server 610 performs a role of deriving an IP address for a communication partner from a received telephone number.

An IP address for the home GW 608 is registered in the IPFAX device 601, and the IPFAX device 601 uses this IP address to transmit a telephone number of the IPFAX device 603, which is a transmission destination, to the home GW 608. With this, the home GW 608 transmits the telephone number to the NGN SIP server 610. From the telephone number, the NGN SIP server 610 returns an IP address for the home GW 611 to the home GW 608, and the home GW 608 transmits this IP address to the IPFAX device 601. With this, the IPFAX device 601 directly establishes a session with the IPFAX device 603 via the home GW 611. Thereby communication (an IPFAX transmission) is performed between the IPFAX device 601 and the IPFAX device 603.

The VoIP GW connection 623 connects the IPFAX device 601—the intranet LAN 607—a VoIP GW 612—an analog telephone network 613—the G3FAX device 604. Using SIP procedures, a session is established between the IPFAX device 601 and the VoIP GW 612. An IP address for the VoIP GW 612 is registered in the IPFAX device 601, and the IPFAX device 601 uses this IP address to communicate with the VoIP GW 612, and transmits a telephone number for the G3FAX device 604, which is a communication partner, to the VoIP GW 612. Upon receiving this, the VoIP GW 612 uses the analog telephone network 613, and makes a call connection to the G3FAX device 604 through procedures of an ordinary analog telephone network. In this fashion, communication between the IPFAX device 601 and the G3FAX device 604 becomes possible. However, when performing FAX communication, T.38, which is an IPFAX procedure, is used for between the IPFAX device 601 and the VoIP GW 612, and T.30, a G3 FAX procedure, is used between the VoIP GW 612 and the G3FAX device 604. The VoIP GW 612 performs both-way transformation between this T.38 procedure and T.30 procedure.

Note that there are many cases where a plurality of VoIP GWs are disposed, as shown in FIG. 6. This is to make communication charges for a PSTN connection beyond a VoIP GW cheaper. For example, by arranging a VoIP GW at each of branch offices (FIG. 6 displays a Tokyo branch office, an Osaka branch office and a Yokohama branch office), a LAN (WAN) is used until each branch office, and communication expenses are eliminated. Transmission further from each branch office is caused to be to a G3FAX device in an area close to that branch office, reducing communication charges from a VoIP GW for each branch office to a G3 FAX. Accordingly, in a case of a VoIP GW connection, a main body is set so that leading numbers for a telephone number designated as a destination are used, to distribute to the VoIP GWs.

For example, a table such as the following is used, and a VoIP GW to connect to is determined from leading numbers of a telephone number which is a destination.

| Telephone number | VoIP GW IP address |
|---|---|
| Starts with 03 | 192.198.3.6 |
| Starts with 06 | 193.212.3.1 |
| Starts with 011 | 192.761.32.1 |

For example, in the case of a telephone number starting with "03" as in "03-2222-3232", a connection is made to the VoIP GW 612 for the Tokyo branch office, which has the IP address "192.198.3.6". Then a G3FAX device having "03-2222-3232" is connected to through an analog telephone network from the VoIP GW 612.

In this way, when a communication mode for an IPFAX communication environment is NGN, NGN my number, intranet (via a SIP server), a server, or a VoIP GW, a server to be connected to is determined by the communication mode. A partner device to be finally connected to is determined from an IP address for the partner device, which is derived from a destination (a telephone number) registered on the server.

Next, explanation is given regarding a subaddress and a password used in T.30 and T.38.

The subaddress and password are codes defined in T.30 and T.38 recommendations, are arranged with a fixed 20 digit positions of numerals, #, *, or spaces, and are codes transferred from a fax transmission device to a fax reception device. For registration of a subaddress and password to a device, data comprised of anything from zero digit positions (not set) to a maximum of 20 digit positions of numerals, #, and * is used. When outputting to a line, the head of a code is filled with a space if registration is for less than 20 digit positions. For example, if registration is for "1234", which is 4 digit positions, 16 digit positions of spaces and 4 digit positions of "1234" are output to the line. A device receiving the code removes the spaces, and recognizes "1234" as a subaddress and a password.

Out of these, regarding a password, as is understood from the name, from a security perspective there is an arrangement so that an input value for the password cannot be confirmed during input or even after input, information for the password is not even saved in a history, and the password is not used in destination registration or retransmission from a transmission history. Regarding the subaddress, the fax industry calls the subaddress an F code, and further explanation will use F code instead of the subaddress.

FIG. 8 depicts a view for explaining an overview of transmission/reception with an F code or a password. Note that portions of FIG. 8 in common with the previously described FIG. 6 are shown with the same reference numerals.

As preparation to receive an F code or a password, when a receiver (the IPFAX device 603) receives a particular F code or password, the receiver performs setting to not print even if a fax is received and instead store the fax in a particular storage medium, such as a hard disk. In addition, for only a particular user to access a particular storage medium, an access password is set in advance. With this, received FAX data is stored to a storage medium, to which a particular password has been set, without being printed on paper by the IPFAX device 603, and so-called confidential reception becomes possible.

If setting to transfer received data to a particular destination when the IPFAX device 603 receives a particular F code or password is performed, the received data is transferred to the particular destination after reception. The case in which this transfer is to a plurality of destinations is called a relay broadcast transmission. In this way, functions such as confidential reception and relay broadcast can be used by using an F code or password.

Furthermore, regarding a password, a function called "password reception" is also used. This is registering a password to be received in advance by the receiver side, and setting to "perform" further password reception. A password received from a partner device at a time of reception is matched against a registered password. Reception is performed only when this matches, and reception is refused when this does not match. In this way, a password reception function can be used by using a password.

Regarding destination registration and retransmission from a transmission history, with conventional G3 FAX, a connecting destination is only a PSTN, and for retransmission and destination registration, it was sufficient to inherit only a destination (a telephone number) from a history. However, in the case of an IPFAX, just a telephone number is insufficient. As previously explained, in the case of an IPFAX, even if a telephone number is used as a destination, there exists a plurality of connecting destinations—NGN, VoIP GW, the intranet or the like. What switches these is a communication mode. The communication mode designates a connecting destination (a server for a connecting destination) by using an IP address, and NGN, NGN my number, VoIP GW, and intranet are modes. When selecting NGN or NGN my number, connection is made to an NGN SIP server via a home GW. NGN my number is a service name for NGN, and is a service for arranging an additional telephone number in addition to a contracted telephone number. When NGN is selected as the communication mode, a contracted telephone number is conveyed to a partner as a transmission source. When NGN my number is selected, an added telephone number is conveyed as a telephone number for the transmission source.

When VoIP GW is selected as a communication mode, a telephone number for a final connecting destination is transmitted to an IP address for a VoIP GW (if a plurality of VoIP GWs are registered, an IP address for a VoIP GW determined through leading numerals of the telephone number, as previously mentioned). With this, communication is possible with a G3 FAX for the final partner. When intranet is selected as a communication mode, a telephone number (extension telephone number) for an IPFAX device of a connecting destination is transmitted to an IP address of an intranet SIP server (if a plurality of intranet SIP servers are registered, an IP address for a first server). In this fashion, communication with an IPFAX device is performed. In this way, in the case of IPFAX, a telephone number and a communication mode are put together, and a final connecting destination is determined.

FIG. 9 depicts a view for showing an example of setting items when transmitting an IPFAX.

FIG. 9 indicates settable items at the time of transmission of an IPFAX and the details thereof, and also indicates whether or not it is necessary to be inherited at a time of destination registration or retransmission from a transmission history according to the first embodiment. Not all content will be explained, but of these, setting is changed according to an original that is transmitted for a resolution at a time of an original read, an original size, a density, a type of an original (text original, photo original), or double-sided/single-sided original. Therefore, these only have meaning when transmitting or registering to a destination the same original, by using a destination, from a transmission history, for which retransmission or registration is performed. But it is not limited to always transmitting the same document to the destination. Therefore, there is no necessity for retransmission or re-registration that inherits this content, so they set with "unnecessary".

Regarding an F code, an F code is a grey setting for whether it is necessary to inherit from the transmission history at a time of retransmission or registration. For example, if settings are not inherited, a received original is simply printed out, even if confidential reception or transfer setting is performed on a receiving side. However, if settings are inherited, conversely no print out is performed on a receiving side. Even with the same transmission partner, the functions of confidential reception or transfer are not necessarily always used, but determined according to a degree of importance of an original transmitted. Therefore, with regard to an F code, the setting is "grey", because it seems that there are cases in which operations not in line with a user's intention are performed, when the value of such at a time of retransmission or registration is inherited or not inherited from a transmission history.

Regarding a password, it is set to not be left in a history from a security perspective as previously explained, and the setting cannot be inherited from a transmission history at a time of retransmission or destination registration. Because the result is retransmission or registration that does not inherit history setting information, if a function of confidential reception or relay broadcast transmission is used, there are cases in which operations not in line with a user's intention are performed, as with the case of retransmission or destination registration that does not inherit an F code. Therefore, the setting for password is "grey but cannot be inherited as history".

In the first embodiment, a communication mode is saved as history information, instead of saving an IP address for a server for a connecting destination. Because, as explained previously, according to a communication mode there are cases in which this is a plurality of servers instead of being limited to one, and the best connecting destination (server) can be determined in accordance with settings of a transmitter at a time, from a selected communication mode.

Note that there is an intranet direct connection, which is a configuration of a communication connection explained with reference to FIG. 6. This connection is effective when there is a setting for an IPFAX device to not use an intranet SIP server. When the communication mode is an intranet and there is a setting to not use an intranet SIP server, it is possible to perform a direct connection to a destination (in this case, an IP address for a partner device) stored in setting information when transmission starts.

In this way, according to the first embodiment, retransmission, destination registration or the like is performed with inheriting a communication mode as a transmission connecting destination and not just a destination (a telephone number) from a transmission history at a time of retransmission or destination registration. Thus, it is possible to correctly perform a fax transmission to a transmission destination to which transmission has been previously performed, without a mistake transmission occurring.

According to the first embodiment, as explained above, when selecting a destination from a transmission history to perform transmission or registration in an address book, transmission or registration can be performed with inheriting a communication mode, that is an IP address for a server to connect to, as a connecting destination, as well as a telephone number as a destination. Thus, even when selecting a destination from a transmission history, it is possible to transmit to a transmission destination intended by a user without making a mistake transmission, and registration to an address book is possible.

Second Embodiment

Next, explanation is given of a second embodiment of the present invention, In this second embodiment, for example, explanation is given of an example of performing retransmission or destination registration on the basis of a transmission history that uses an F code or a password.

As previously explained with reference to FIG. 9, there are many types of setting items for when performing a fax transmission, and of these, there is the possibility of a mistake transmission if a destination (a telephone number) and a communication mode are not inherited reliably. For this reason explanation was given in the first embodiment regarding retransmission or destination registration that inherits these.

Next, because an F code is, for example, designated to be stored in a storage medium without printing, transferred, or the like, even when a fax is received, as previously explained, there are cases in which an operation not in line with a user's intent is performed despite whether the F code is inherited or not inherited. In addition, with regard to a password, it is not left in a history. Therefore, transmission or registration processing with inheriting the password is not possible, but there is the possibility of performing an operation not in line with a user's intent similar to when an F code is not inherited, and furthermore, there is the possibility that transmission to a partner device with a "password reception" function turned on becomes not possible.

Thus in the second embodiment, at a time of retransmission or destination registration that uses a transmission history, if using a history transmitted with an attached F code, a user is notified that a history with an attached F code is selected. The user is then allowed to select so as to perform retransmission or destination registration with the attached F code or after deleting the F code.

Furthermore, in the second embodiment, when performing retransmission or destination registration that uses a transmission history, if using a history transmitted with an attached password, a user is notified that a history with an attached password is selected. The user is then allowed to select whether to re-set the password and then transmit, or transmit without a password. Note that a hardware configuration, a communication environment, and the like for the communication apparatus according to the second embodiment are the same as the configuration of the communication apparatus 1000 in accordance with the previously described first embodiment, and thus explanation thereof is omitted.

Figure 10:
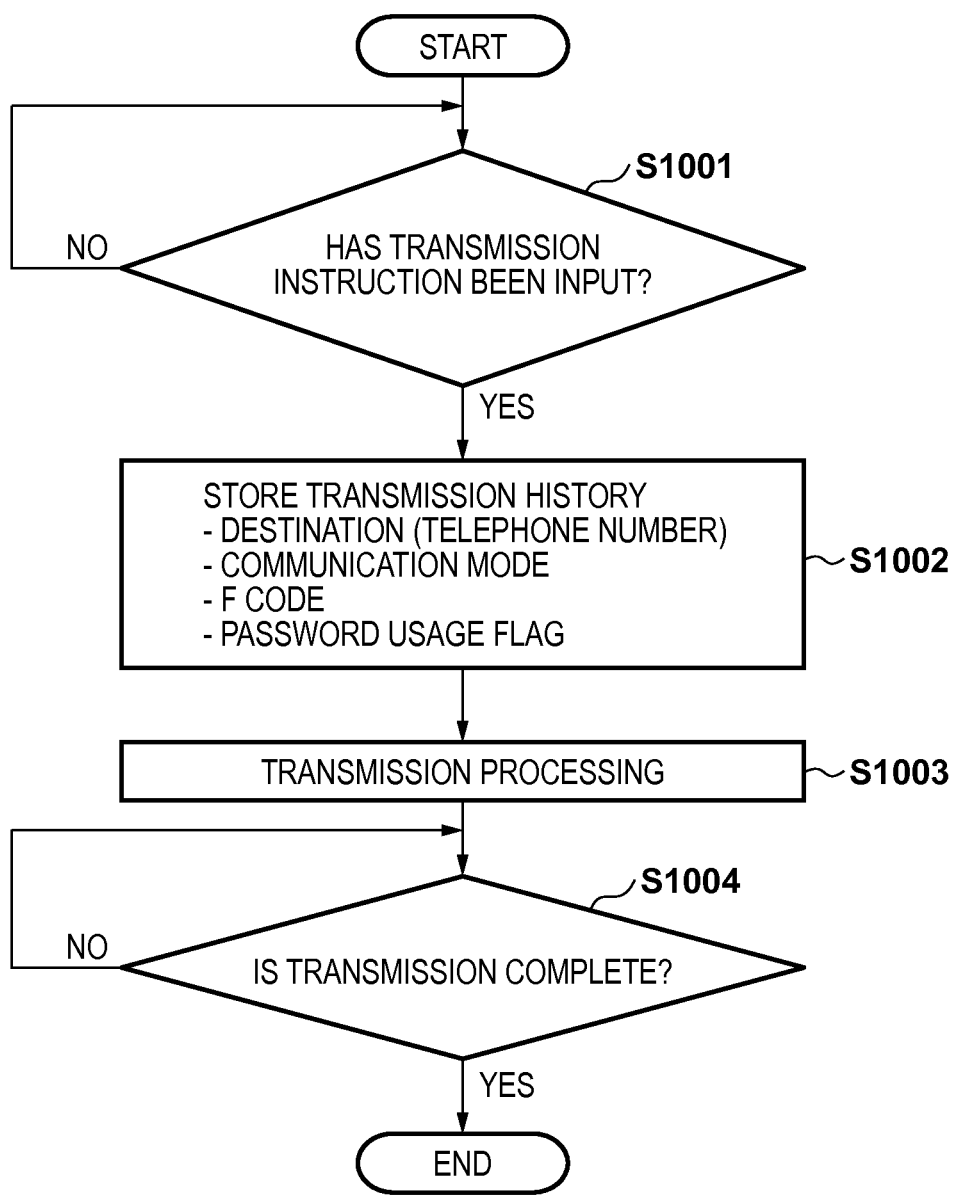
FIG. 10 is a flowchart for describing transmission processing by a communication apparatus according to a second embodiment.

FIG. 10 is a flowchart for describing transmission processing by the communication apparatus 1000 according to the second embodiment. Here is shown initial transmission processing for storing transmission history. Note that, a program that executes this processing is installed on the HDD 110, and when executed is deployed into the RAM 109 and executed under the control of the CPU 101.

Firstly, in step S1001 the CPU 101 determines whether a fax transmission instruction has been input. This is determining whether a user has performed a transmission instruction, such as by inputting a destination via the console unit 103, setting an original to send in the scanner unit 104, and pressing a start key for the console unit 103. If a transmission instruction is input, the processing proceeds to step S1002, and the CPU 101 registers the setting information set through this fax transmission as a transmission history in a storage medium, such as the HDD 110. The setting information includes a set transmission destination (a telephone number), a selected communication mode, an F code, a password usage flag that is an indicator showing usage/non-usage of a password, or the like. Here, because it is not possible to store a password itself, a password usage flag is prepared, and this flag is only on when a password has been used. In a case of non-usage of a password, it is possible to determine whether a password has been input, if a password registration area is set in advance with a specific code that is not used for a password (for example, a code filled with 0xF in base-16). Next, the CPU 101 advances the processing to step S1003, and executes transmission processing, waits for transmission to terminate in step S1004, and then terminates this processing.

In accordance with this processing, when fax transmission is executed, a telephone number for the destination, as well as a communication mode, F code, and information denoting the usage/non-usage of a password at the time of the transmission is stored as transmission history.

Figure 11:
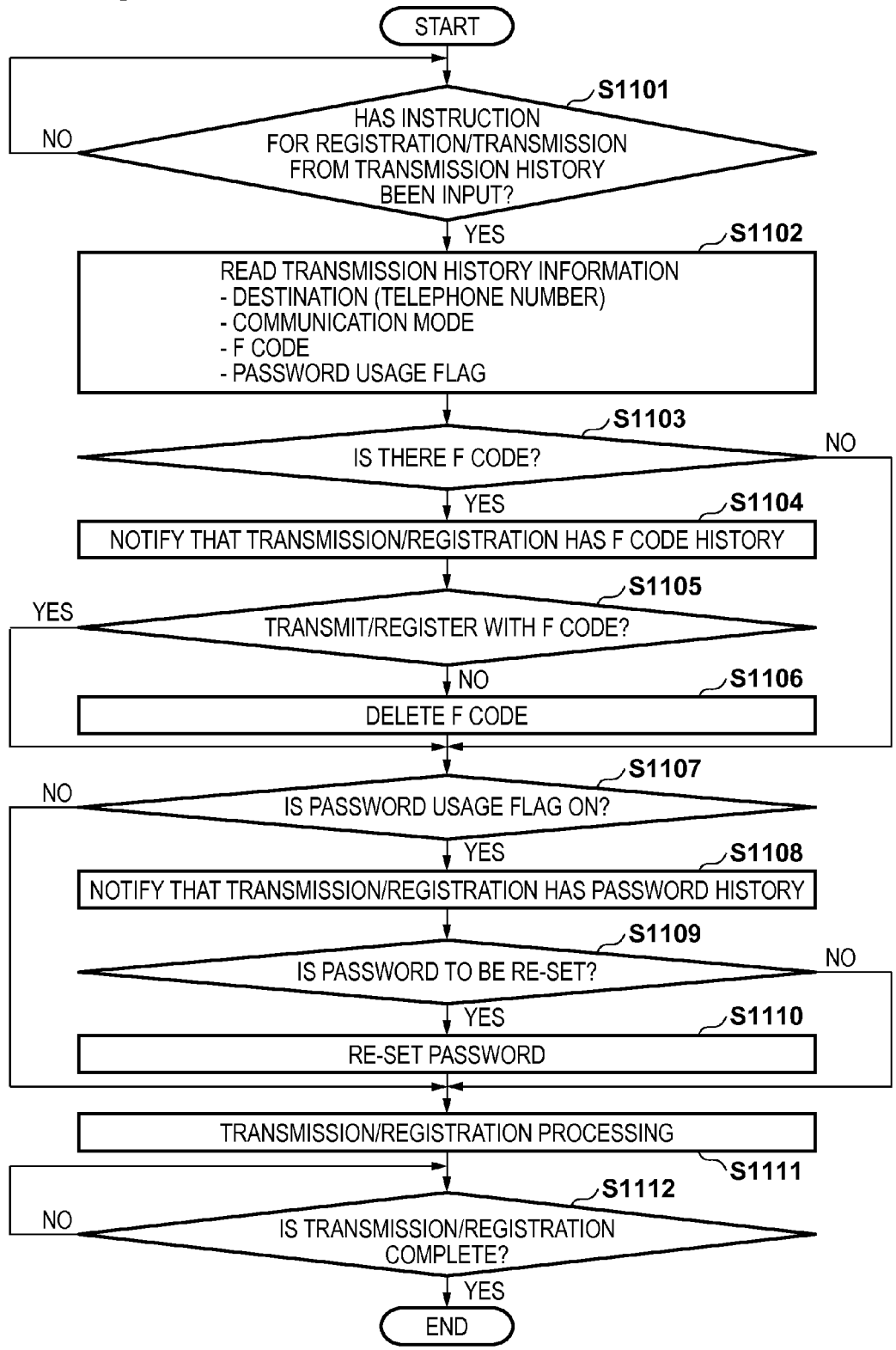
FIG. 11 is a flowchart for describing destination registration processing or retransmission, with referring to a transmission history, by the communication apparatus according to the second embodiment.

FIG. 11 is a flowchart for describing destination registration processing or retransmission, with referring to a transmission history, by the communication apparatus 1000 according to the second embodiment. Note that, a program that executes this processing is installed on the HDD 110, and when executed is deployed into the RAM 109 and executed under the control of the CPU 101.

Figure 12:
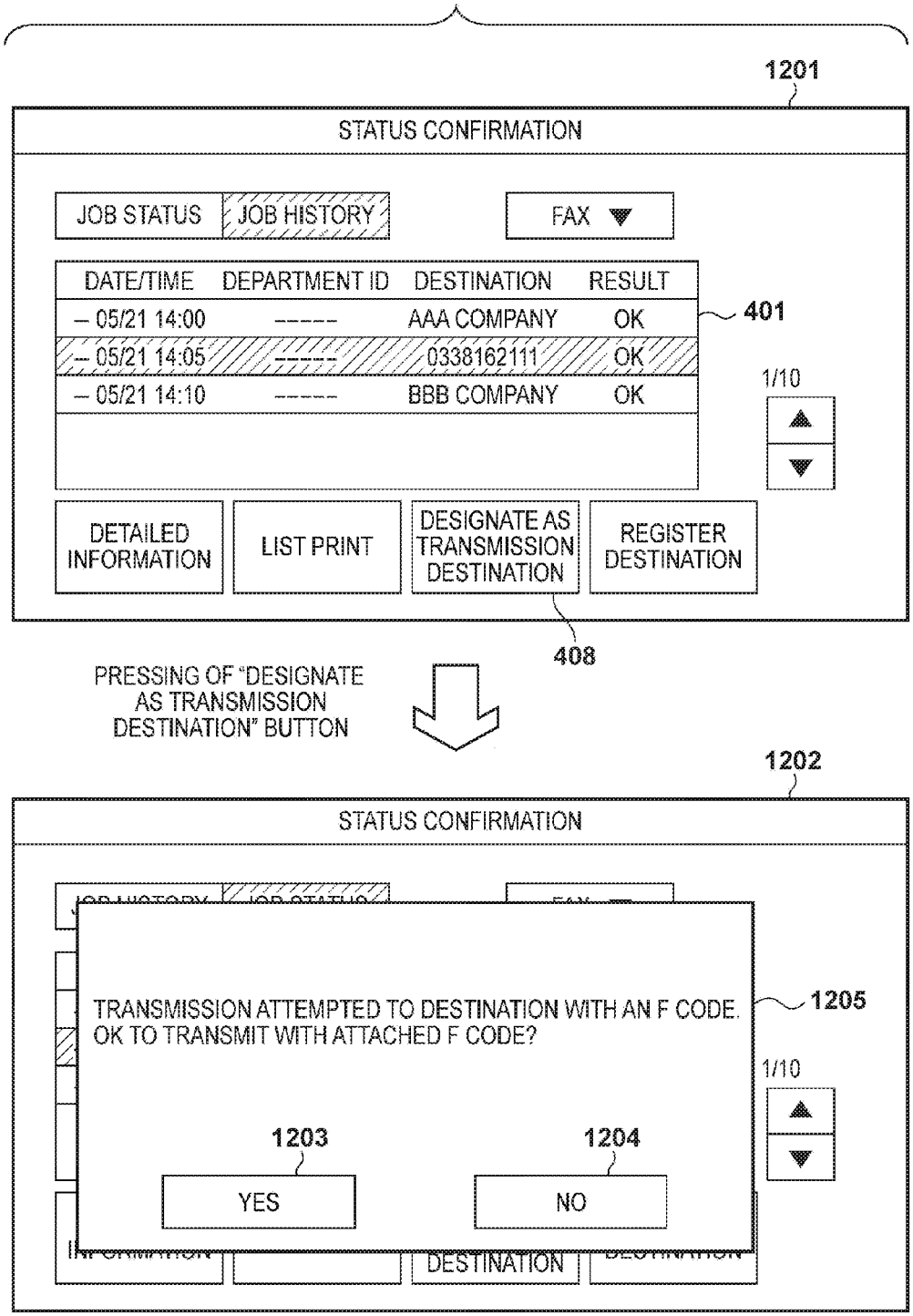
FIG. 12 depicts is a view for showing an example of screens displayed on a console unit when performing a fax transmission after selecting from a transmission history a destination that includes an F code, in the second embodiment.
Figure 13:
FIG. 13 depicts a view for showing an example of screens displayed on the console unit when selecting from a transmission history a destination that includes an F code and then registering the destination to an address book, in the second embodiment.

Firstly, in step S1101 the CPU 101 uses a transmission history to determine whether or not a transmission instruction or an address registration instruction has been input. This is determined by whether a user has displayed the status confirmation screen shown on FIG. 4A through the console unit 103, and then pressed the "designate as transmission destination" button 408 or the "register destination" button 409. Here, processing proceeds to step S1102 when the "designate as transmission destination" button 408 or the "register destination" button 409 is pressed, and a destination (telephone number), communication mode, F code, and password usage flag, which were registered in step S1002 of FIG. 10 as a transmission history are read. Next, the processing proceeds to step S1103, and the CPU 101 determines whether or not an F code is stored in the transmission history. If an F code storage area is not used, the F code is set in advance so to be initialized to a specific code (for example, a code filled with 0xF in base-16). By doing this, it is possible to determine the usage/non-usage of an F code, on whether a code read from an F code storage area is the specific code. Here, the processing proceeds to step S1104 if it is determined that the transmission history uses an F code, and the CPU 101, for example, displays screens 1202 or 1302, which are shown in FIG. 12 or FIG. 13, on the console unit 103, and a user is notified of transmission or registration with an F code history. However, the processing advances to step S1107 when there is not a transmission history that used an F code.

In step S1105, the CPU 101 allows the user to select between transmission or registration with an F code added, or transmission or registration with an F code deleted. Here, processing proceeds to step S1107 if the user selects transmission or registration with an F code added, but proceeds to step S1106 if the user selects transmission or destination registration with an F code deleted. In step S1106, the CPU 101 deletes the read F code, and proceeds to step S1107.

The above processing is performed via the pop-up screens shown on FIG. 12 and FIG. 13. Note that portions of FIG. 12 and FIG. 13 in common with the previously described FIG. 4A are shown with the same reference numerals.

FIG. 12 depicts a view for showing an example of screens displayed on the console unit 103 when performing a fax transmission after selecting from a transmission history a destination that includes an F code, in the second embodiment.

With a status confirmation screen 1201 of FIG. 12, when the "designate as transmission destination" button 408 is pressed in a state where a destination is selected from the list 401 of a transmission history, if the destination includes an F code, a pop-up screen 1205 is displayed, notifying a user that the transmission history has an F code, as shown in a screen 1202. With the pop-up screen 1205 here, whether to transmit with an F code or after deleting an F code is user-selectable. With the pop-up screen 1205, if a user selects a "YES" button 1203, a destination is set with an added F code. If a "NO" button 1204 is selected, a destination of transmission is set with an F code deleted.

FIG. 13 depicts a view for showing an example of screens displayed on the console unit 103 when selecting a destination that includes an F code from a transmission history and then registering the destination into an address book, in the second embodiment.

In a status confirmation screen 1301 of FIG. 13, a user presses the "register as address" button 409 in a state where a destination is selected from the list 401 of a transmission history. If it has been determined that an F code is used in the destination, then a transition is made to a screen 1302, and a pop-up screen 1305, which gives notification of a destination that has an F code, is displayed. With the pop-up screen 1305, the user is able to select whether to register with an attached F code or register after an F code is deleted. With the pop-up screen 1305, if the user selects a "YES" button 1303, the destination is registered to an address book with an F code attached, and if the user selects a "NO" button 1304, then registration is performed after an F code is deleted.

Next, the explanation returns to FIG. 11, and in step S1107 the CPU 101 determines whether or not the password usage flag from transmission history information read in step S1102 is on. Here, if the password usage flag is off, processing proceeds to step S1111, and transmission or destination registration processing is initiated. However, if the password usage flag is on, the processing proceeds to step S1108, the CPU 101, for example, displays a screen 1402 or screen 1502 shown on FIG. 14 or FIG. 15 on the console unit 103, to notify a user of transmission or registration from a history that has a password. The processing proceeds to step S1109, and the CPU 101 determines whether or not a user has selected whether to re-set a password, and if the re-set of the password is instructed, the processing proceeds to step S1110, and re-setting is performed with a password input by a user.

The above processing is performed via the pop-up screens shown on FIG. 14 and FIG. 15. Note that portions of FIG. 14 and FIG. 15 in common with the previously described FIG. 4A are shown with the same reference numeral.

FIG. 14 depicts a view for showing an example of screens displayed on the console unit 103 when performing a fax transmission after selecting from a transmission history a destination that includes a password, in the second embodiment.

With a status confirmation screen 1401, if it is determined that a user has pressed the "designate as transmission destination" button 408 in a state where a destination is selected from the list 401 of a transmission history and a password has been used in the selected destination, then a transition is made to a status confirmation screen 1402. With the status confirmation screen 1402, a pop-up screen 1405 is displayed to give notification of a destination that has a password. With the pop-up screen 1405, whether a user re-sets a password or transmits without a password is selectable. With the pop-up screen 1405, if a user selects a "YES" button 1403, then a transition is made to the F code, password setting screen of FIG. 5A. Here, a user can re-set a password through this screen, and perform a fax transmission with a password. In contrast, with the pop-up screen 1402, if a user selects a "NO" button 1404, a password is not re-set, and fax transmission without a password is performed.

FIG. 15 depicts a view for showing an example of screens displayed on the console unit 103 when selecting a destination that includes a password from a transmission history and then registering the destination into an address book, in the second embodiment.

With a status confirmation screen 1501, if the "register destination" button 409 is pressed in a state where a destination is selected from the list 401 of transmission history and it is determined that a password is used in the selected destination, then a transition is made to a screen 1502. With the screen 1502, a pop-up screen 1505 is displayed to give notification of a destination that has a password. Here, a user can select whether to re-set a password through the screen 1505, or perform registration without a password. With the pop-up screen 1505, if a user selects a "YES" button 1503, a transition is made to an F code, password setting screen shown in FIG. 5B, and when a user re-sets a password through this screen, registration to an address book is performed with a password. When a user selects a "NO" button 1504, a password is not re-set, and registration to an address book is performed without a password.

When processing of step S1110 completes, the processing proceeds to step S1111. In step S1111, the CPU 101 performs retransmission to a destination read from a history or registration to an address book of a destination read from a history, with an F code selected by a user or without an F code, and furthermore with a password re-set by a user or without a password. The processing proceeds to step S1112 and the CPU 101 determines whether the transmission or destination registration processing in step S1111 has completed or not, and when completion is determined, this processing terminates.

Note that an explanation was given of a notification in step S1104 and step S1108 in a case of a transmission destination or registration destination having been selected from a transmission history as in FIG. 12 to FIG. 15, but the present invention is not limited to this, and, for example, notification could be performed when instructing "transmission to a destination" or when instructing "registration of a destination", instead of when selecting a destination.

According to the second embodiment, as explained above, it becomes possible to notify a user of retransmission or destination registration from a history that uses the F code, and then perform retransmission or destination registration with the F code or with the F code deleted. Thereby, when a destination selected from history includes an F code, it becomes possible to perform retransmission or destination registration after arousing a user's attention and the user determining whether or not to add an F code.

Furthermore, it becomes possible to notify a user of destination registration or retransmission from a history that used a password, and then perform retransmission or destination registration by either re-setting the password, or without a password. Thereby, if a destination selected from a history includes a password, it becomes possible to arouse a user's attention, and then perform retransmission or destination registration with a password or without a password after the user has determined whether or not to add a password.

In the second embodiment, when performing destination registration or retransmission from a transmission history that used an F code, a user is notified of a history transmitted with an F code, and furthermore, a user can select to perform retransmission or destination registration either adding the F code or with the F code deleted. Thereby, transmission or destination registration with reliability on the existence or absence of an F code, after arousing a user's attention, is possible.

Furthermore, a user is notified of destination registration or retransmission from a history that used a password, and a user can select whether to re-set a password and then transmit or register, or to transmit or register without a password. Thus, if a destination selected from a history includes a password, transmission or destination registration with a password or with a password in accordance with a selection by a user is possible, after a user's attention is aroused.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Application No. 2014-163048, filed Aug. 8, 2014, which is hereby incorporated by reference herein in its entirety.

What is claimed is:

1. A method of controlling a communication apparatus capable of facsimile transmitting image data, the method comprising:
   storing, as a transmission history, a destination of a facsimile transmission and an F code used for the facsimile transmission;
   displaying a list of the transmission history stored in the storing;
   determining whether or not a transmission history selected from the list of the transmission history contains the F code;
   displaying a first screen to allow a user to select whether to set the F code for a facsimile transmission of image data, in a case that it is determined in the determining that the F code is contained in the selected transmission history; and
   reading a destination and the F code included in the transmission history selected by the user, and setting the destination and the F code for the facsimile transmission, in a case that it is selected by the user to set the F code via the first screen.

2. The method according to claim 1, wherein the transmission history further includes password usage information indicating whether or not a password was used for the facsimile transmission, and the method further comprises:
   displaying a second screen to allow a user to select whether to set a password, in a case that the password usage information included in the transmission history selected from the list of the transmission history indicates that a password was used in the facsimile transmission; and
   displaying a third screen for an input of a password and receiving the input of the password, in a case that it is selected to set the password via the second screen.

3. The method according to claim 1, further comprising:
   displaying, together with the list, a first button for designating a transmission destination; and
   reading a destination included in the transmission history selected from the list in accordance with a selection using the first button and setting the read destination as the transmission destination of the image data.

4. The method according to claim 3, wherein the F code is an item indicating processing for the image data that is executed by a destination apparatus that receives the image data.

5. The method according to claim 4, wherein the processing for the image data that is executed by the destination apparatus includes at least one of storing the image data into a memory of the destination apparatus without printing the image data and transferring the image data to another apparatus without printing the image data.

6. The method according to claim 1, wherein the storing stores a destination of a facsimile transmission and an F code used in the facsimile transmission in accordance with an execution of the facsimile transmission.

7. The method according to claim 1, wherein the list of the transmission history includes at least a transmission time and date, a destination, and a result of the facsimile transmission.

8. The method according to claim 1, wherein the communication apparatus is capable of performing an IP facsimile transmission via an IP network, and
   wherein the transmission history includes a destination of the IP facsimile transmission and a communication mode in the IP facsimile transmission.

9. The method according to claim 8, wherein the IP network is a high-speed digital line network.

10. The method according to claim 8, wherein the communication mode includes at least one of communication through a Next Generation Network (NGN), an NGN my number, an intranet via a Session Initiation Protocol (SIP) server, a server, or a Voice over IP Gateway (VoIP GW).

11. The method according to claim 8, further comprising reading a destination and a communication mode included in the transmission history selected from the list and registering the destination and the communication mode in an address book.

12. The method according to claim 11, further comprising:
   displaying, together with the list, a second button for designating to register the destination into the address book; and
   reading a destination and a communication mode included in the transmission history selected from the list in accordance with a selection using the second button and registering the read destination and communication mode into the address book.

13. A non-transitory computer-readable storage medium storing a program that causes at least one processor to perform a method of controlling a communication apparatus capable of facsimile transmission of image data, the method comprising:
   storing in a memory, as a transmission history, a destination of a facsimile transmission and an F code used for the facsimile transmission;

displaying a list of the transmission history stored in the memory on a display unit;
determining whether or not a transmission history selected from the list of the transmission history contains the F code;
displaying a screen to allow a user to select whether to set the F code for a facsimile transmission of image data, in a case that it is determined in the determining that the F code is contained in the selected transmission history; and
reading a destination and the F code included in the transmission history selected by the user and setting the destination and the F code for the facsimile transmission, in a case that it is selected by the user to set the F code via the screen.

14. A communication apparatus capable of facsimile transmission of image data, the apparatus comprising:
a display;
a memory that stores a set of instructions; and
at least one processor that executes the instructions to:
store, as a transmission history, a destination of a facsimile transmission and an F code used for the facsimile transmission in the memory;
display, on the display, a list of the transmission history stored in the memory;
display, on the display, a screen to allow a user to select whether to set an F code for a facsimile transmission of image data, in a case that a transmission history selected from the list of the transmission history contains the F code; and
read a destination and the F code included in the transmission history selected by the user and set the destination and the F code for the facsimile transmission, in a case that it is selected by the user to set the F code via the screen.

* * * * *